Patented Apr. 8, 1941

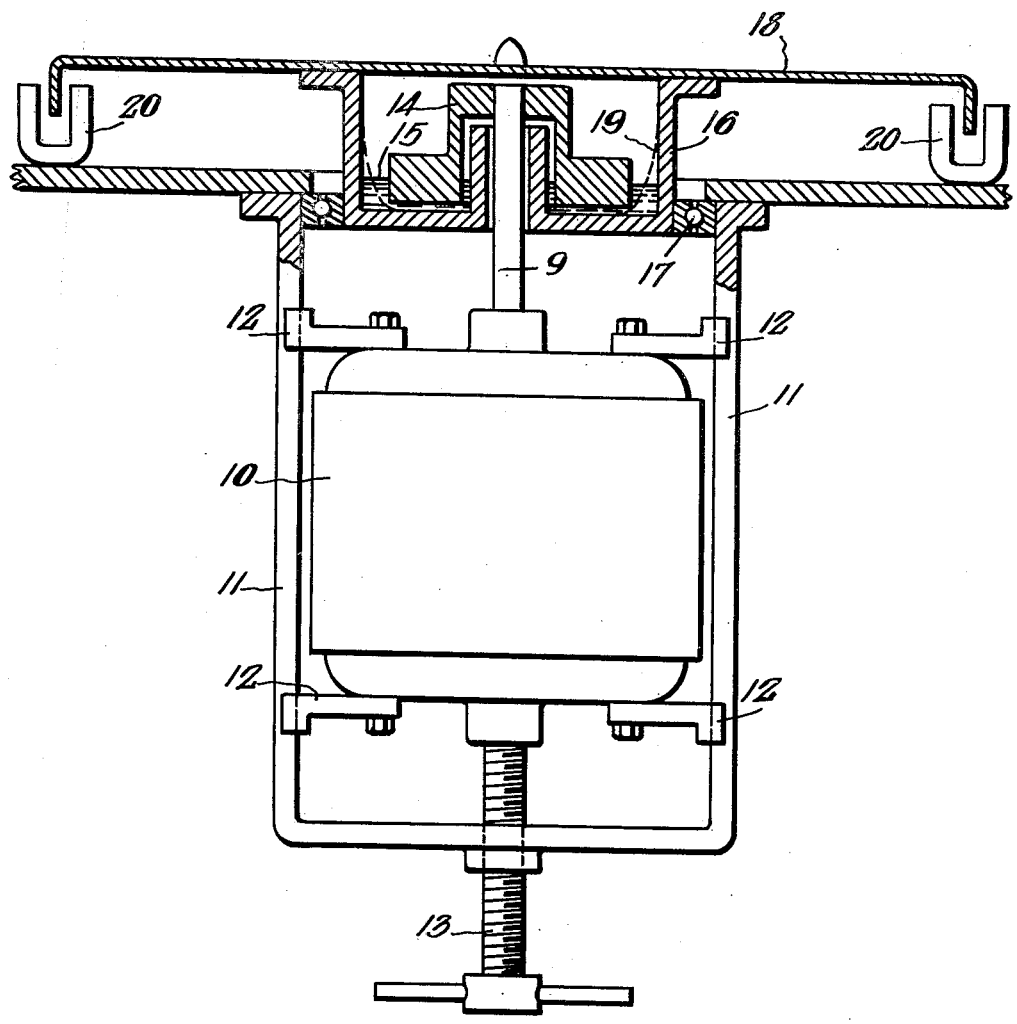

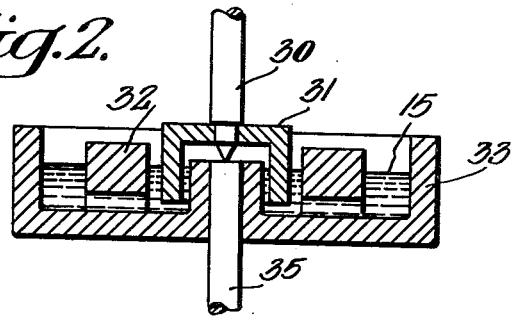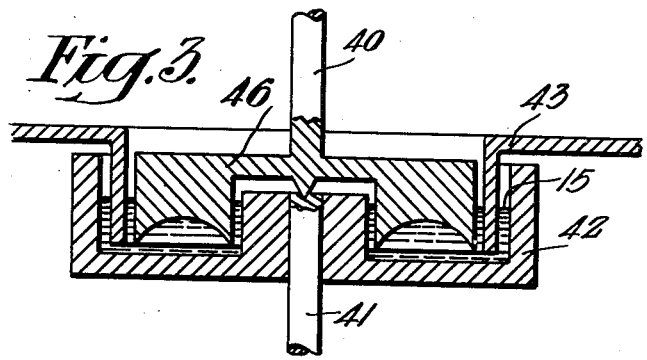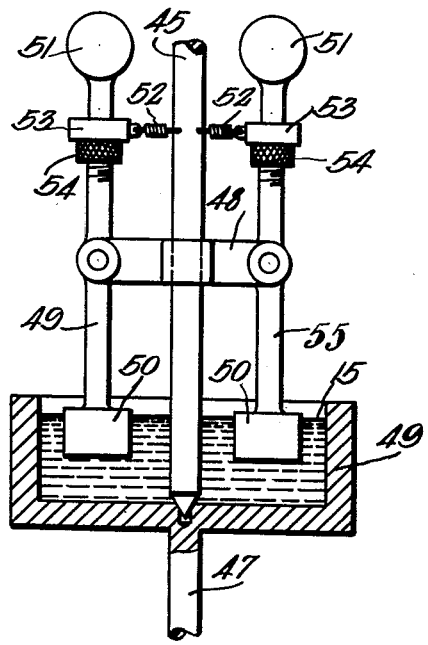

2,237,907

UNITED STATES PATENT OFFICE 2,237,907

POWER TRANSMITTING DEVICE

Daniel O. Landis, Upper Darby, Pa., assignor to Radio Corporation of America, a corporation of Delaware Application August 31, 1939, Serial No. 292,791

6 Claims. (Cl. 192—12)

This invention relates to power transmitting devices and more particularly to a liquid power transmitting device adapted to operate the driven member at a constant speed. Liquid clutches are, of course, well known, but the present invention adapts a liquid clutch to operate as a governor so that as the speed of the driven member increases the driving torque decreases due to movement of the liquid, and the driven member thereby reaches a speed where the deceleration due to friction and the acceleration due to the liquid drive are equal and the speed thereaftar remains constant.

In the performance of my invention, I provide a rotatable liquid container and a relatively rotatable member therein. Either of these members may be the driving member and the other the driven member. These two members are coupled by an appropriate liquid, such as oil or mercury. The contour of the two rotatable members is so determined that an increase in speed causes the fluid liquid to move outwardly in the container due to the effect of the centrifugal force, and the coupling between the liquid and the rotatable member within the container is thereby decreased.

I may also provide an appropriate drag on the driven member, which drag may be in the form of a viscous brake or a magnetic brake. Since the effect of a viscous or magnetic brake increases with the velocity difference, while the effect of the driving member on the driven member decreases with a decrease in velocity difference, the operating speed of the driven member may then be determined with great accuracy. In addition to the foregoing, I may provide a relative adjustment of the driving and driven members to adjust either the operating speed or to adjust the mechanism for a constant operating speed at different loads.

One object of the invention is to provide an improved power transmission apparatus.

Another object of the invention is to provide an improved speed-control device.

Another object of the invention is to provide an improved constant speed drive mechanism.

Another object of the invention is to provide an improved drive mechanism which is particularly adapted to drive sound-reproducing apparatus at a constant speed.

Other and incidental objects of the invention will be apparent to those skilled in the art from a reading of the following specification and an inspection of the accompanying drawings, in which Figure 1 is a side view, partly in vertical section, of one form of my invention as applied to a phonograph, Figure 2 is a vertical section through a second form of the invention, and Figures 3 and 4 are vertical sections through additional species of the invention.

Referring first to the form of invention shown in Fig. 1, an appropriate driving motor 10 is provided which is supported for vertical movement in the guides 11 by the brackets 12 which engage the guides. Vertical adjustment is secured by means of the screw 13 which is provided with an appropriate hand-wheel. The shaft of the motor 10 carries to its upper end the impeller 14. This impeller may be a solid round member of the cross-section shown, or it may be provided with a series of blades or other equivalent members to engage a liquid 15, which may be mercury, oil or other liquid of appropriate density and viscosity. The liquid 15 is carried in a cup 16 which is rotatable on the annular ball bearing 17. The cup 16 has an extension upwardly along the shaft of the motor 10 to a sufficient height to prevent loss of liquid, but this extension does not come in contact with either the motor shaft or with the impeller 14. In the form of the invention shown, the cup 16 carries a phonograph turntable 18, but it will be apparent a pulley or other transmitting means may be substituted for the phonograph turntable.

The turntable 18 is made of an appropriate electrically conductive material and at its outer edge there are provided magnets 20 which produce drag on the rim of the turntable when it is being rotated, the amount of this drag depending upon the speed of the rotation.

In the operation of the device, the motor 10 is operated as usual, driving the impeller 14. This impeller 14 causes rotation of the liquid 15 and, due to the contact thereof with the cup 16, causes rotation of the cup 16 together with the turntable. When the motor is first started, the liquid is horizontal as shown in the solid lines. However, as the cup 16 picks up speed, the liquid is thrown toward the outside of the cup by its centrifugal force and tends to reach the position shown in the dotted lines 19. As the speed became sufficiently high, the liquid would be thrown completely out of contact with the impeller 14. However, a certain amount of drag is produced on a phonograph turntable by the needle contacting the phonograph record and, in addition, currents are introduced in the turntable 18 by the magnets 20, which likewise tend to produce a drag on the turntable. This drag, due to the magnets, increases with the speed of the turntable. The torque applied to the cup 16 through the liquid 15, however, decreases if the liquid is thrown outwardly by centrifugal force, and the speed of the cup 16 will, therefore, increase up to the point where the force delivered by the impeller 14 just equals the retarding force of the magnets 20, the drag of the phonograph pickup, and the friction in the bearing 17. The turntable can go no faster since any increase in speed of the turntable would decrease the contact of the liquid 15 with the impeller 14 and thereby decrease the driving force. If it is desired to change the speed of the turntable, this may be accomplished within certain limits by moving the impeller 14 up or down in the liquid by means of the screw 13. If the impeller 14 is moved down, it will tend to keep a greater area in contact with the liquid at any given speed, or to keep the same area in contact at a higher speed and will, therefore, drive the turntable faster.

In the form of the invention shown in Fig. 2, either the shaft 30 or the shaft 35 may be the driver. This form of the invention differs from that in Fig. 1 in that considerably more space is allowed for movement of the liquid. The inverted cup 31 is immersed in the liquid adjacent the hub and adjacent the outside of the cup 31 is the annular member 32, which is rigidly secured to the outer cup 33, but with passages thereunder for the movement of the liquid. At low speeds the liquid provides coupling between the cup 31 and the member 32, as well as between the hub of the cup 33 and the cup 31. As the speed increases, the liquid moves into the large annular space outside of the member 32, thereby decreasing the level adjacent the member 31. It will be apparent that, in this form of the invention, due to the relatively large diameter of the cup 33, with the correspondingly greater centrifugal effect adjacent its periphery, a very sensitive speed control will be secured.

The form of the invention shown in Fig. 3 is somewhat similar to that shown in Fig. 2 in that either the shaft 40 or the shaft 41 may be the driving member and the other the driven member. In this case, an annular stationary member 43 is provided which is immersed in the liquid adjacent the periphery of the cup 42. As the speed of the device increases, the liquid is caused to move radially of the cup and not only decreases the coupling between the member 46 and the member 42, but, due to its greater height at the periphery, it also increases the coupling between both the member 42 and the member 46 and the member 43, thereby providing an increased braking action on both rotating members as the speed is increased.

In the form of the invention shown in Fig. 4, a mechanical governor control is provided in addition to the fluid control. In this form of the invention, the driving force is preferably applied to the shaft 47, while the shaft 45 is driven at a substantially constant speed. The bracket 48 on the shaft 45 carries the governor arms 49 which, in turn, carry the members 50 immersed in the liquid 16. These members 50 may be in the form of annular blocks, paddles, or elements of other appropriate shape adapted to cooperate with the liquid. The upper ends of the arms 49 carry the governor balls 51 which are urged toward the shaft 45 by the springs 52. These springs 52 may be connected to the rings 53 which are adjustable along the arms 49 to regulate the tension of the springs. It will be apparent from an inspection of the drawing that as the speed of the shaft 55 increases the governor balls 51 will move outwardly, thereby causing the liquid engaging members 50 to move inwardly and decreasing the driving torque thereon. At the same time, the liquid 15 will move outwardly in the cup 55, thereby decreasing the depth of immersion of the members 50 and correspondingly decreasing the driving torque thereon.

Having now described my invention, I claim:

1. In combination, an outer liquid containing member, an inner liquid engaging member, one of said members adapted to be a driving member and the other adapted to be a driven member, liquid in said outer member and engaging said inner member, said inner member being so shaped that the engagement thereof with the liquid will continuously decrease as the speed increases.

2. In combination, an outer liquid containing member, an inner liquid engaging member, one of said members adapted to be a driving member and the other adapted to be a driven member, liquid in said outer member and engaging said inner member, said inner member being so shaped that the engagement thereof with the liquid will continuously decrease as the speed increases, and a braking means continuously engaging the driven member.

3. In combination, an outer liquid containing member, an inner liquid engaging member, one of said members adapted to be a driving member and the other adapted to be a driven member, liquid in said outer member and engaging said inner member, said inner member being so shaped that the engagement thereof with the liquid will decrease as the speed increases, and braking means producing a braking effect increasing with the speed in cooperative relation with the driven member.

4. Power transmitting apparatus including an outer liquid containing cup, an inner liquid engaging member, liquid in said cup engaging said member, said cup being so shaped as to permit the liquid to flow outwardly under centrifugal force and continuously decrease the engagement with the inner member with increasing speed.

5. Power transmitting apparatus including an outer liquid containing cup, an inner liquid engaging member, liquid in said cup engaging said member, said cup being so shaped as to permit the liquid to flow outwardly under centrifugal force and decrease the engagement with the inner member, and an annular stationary brake between said outer and inner members and immersed in said liquid.

6. Power transmitting apparatus including an outer liquid containing cup, an inner liquid engaging member, liquid in said cup engaging said member, said cup being so shaped as to permit the liquid to flow outwardly under centrifugal force and continuously decrease the engagement with the inner member, and centrifugal means for further decreasing the engagement of said inner member with said liquid.

DANIEL O. LANDIS.